US009260274B2

(12) United States Patent
Meyer et al.

(10) Patent No.: US 9,260,274 B2
(45) Date of Patent: Feb. 16, 2016

(54) LIFT FOR A WIND POWER INSTALLATION

(75) Inventors: Hermann Meyer, Grossheide (DE);
Ulrich Neundlinger, Aurich (DE)

(73) Assignee: Aloys Wobben, Aurich (DE)

( * ) Notice: Subject to any disclaimer, the term of this patent is extended or adjusted under 35 U.S.C. 154(b) by 647 days.

(21) Appl. No.: 13/464,890

(22) Filed: May 4, 2012

(65) Prior Publication Data

US 2012/0279805 A1    Nov. 8, 2012

Related U.S. Application Data

(63) Continuation-in-part of application No. PCT/EP2010/066667, filed on Nov. 3, 2010.

(30) Foreign Application Priority Data

Nov. 6, 2009   (DE) .......................... 10 2009 053 249

(51) Int. Cl.
*B66B 11/02*   (2006.01)
*B66B 9/16*   (2006.01)
(Continued)

(52) U.S. Cl.
CPC ........... *B66B 11/0226* (2013.01); *B66B 5/0087* (2013.01); *B66B 11/0246* (2013.01); *F03D 1/003* (2013.01); *B66B 9/16* (2013.01); *B66B 11/06* (2013.01); *F05B 2240/916* (2013.01)

(58) Field of Classification Search
CPC .. B66B 11/06; B66B 11/0075; B66B 5/0087; B66B 11/024; B66B 17/04; B66B 17/10; B66B 17/34; B66B 9/16; A47F 3/00; A47F 3/06; E04B 1/34; E04B 1/3404; E04G 3/305; E04G 2003/286; F03D 1/003; Y02B 50/12

USPC ................. 187/261, 262, 250, 266; 52/745.1, 52/745.17; 254/288, 289, 329, 330; 182/145, 148; 312/272.5
See application file for complete search history.

(56) References Cited

U.S. PATENT DOCUMENTS 1,571,100 A   1/1926  Skinner
3,468,401 A   9/1969  Letz
(Continued)

FOREIGN PATENT DOCUMENTS

AR   228435   3/1983
CL    41671   8/1998
(Continued)

OTHER PUBLICATIONS

EPO Machine Translation, DE 10104351 A1, May 30, 2015, pp. 1-11.*

*Primary Examiner* — William A Rivera
*Assistant Examiner* — Stefan Kruer
(74) *Attorney, Agent, or Firm* — Seed IP Law Group PLLC

(57) ABSTRACT

The invention concerns a lift having a drive unit. The invention further concerns a wind power installation having a lift. To reduce the costs of the lift and thus make the lift economically more attractive the lift of the kind set forth in this specification is characterized by a cupboard used as the lift car. In that respect the invention is based on the realization that a cupboard in its basic structure with bottom, side walls and a door does not differ from a lift car produced specifically for a lift. Naturally there are differences, for example in suspension and operation of the door, but those differences can be removed insofar as they are an obstacle to use of a cupboard as a lift car so that the complication and expenditure overall is always still less than the complication and expenditure for a lift car constructed specifically for the lift.

10 Claims, 8 Drawing Sheets

(51) Int. Cl.
  *B66B 5/00* (2006.01)
  *B66F 11/04* (2006.01)
  *E04G 3/32* (2006.01)
  *F03D 11/04* (2006.01)
  *F03D 1/00* (2006.01)
  *B66B 11/06* (2006.01)

(56) References Cited

U.S. PATENT DOCUMENTS

| | | | |
|---|---|---|---|
| 3,627,079 A * | 12/1971 | Nielsen et al. | 187/406 |
| 6,006,865 A * | 12/1999 | Ammon | 187/266 |
| 6,102,163 A | 8/2000 | Liebetrau et al. | |
| 2003/0015378 A1* | 1/2003 | Elsner | 187/336 |
| 2006/0201750 A1* | 9/2006 | Hashiguchi | 187/266 |
| 2011/0266096 A1* | 11/2011 | Nies | B66B 9/16 187/251 |

FOREIGN PATENT DOCUMENTS

| | | | | |
|---|---|---|---|---|
| CL | 46147 | | 4/2004 | |
| CL | 3438-2006 | | 1/2008 | |
| CN | 201195650 Y | * | 2/2009 | ............... B66B 7/02 |
| CN | 201261671 Y | * | 6/2009 | ............... B66B 7/02 |
| CN | 201296587 Y | * | 8/2009 | ............... B66B 7/02 |
| CN | 201458461 U | * | 5/2010 | ............... B66B 7/02 |
| DE | 101 04 351 A1 | | 8/2002 | |
| DE | 10318675 A1 | * | 11/2004 | ............. B66F 11/04 |
| DE | 10 2005 009 500 A1 | | 9/2005 | |
| DE | 10 2006 034 299 A1 | | 1/2008 | |
| DE | 102006034299 A1 | * | 1/2008 | ............... B66B 9/00 |
| DE | 10 2008 005 556 A1 | | 7/2009 | |
| EP | 1078876 A2 | * | 2/2001 | ............. B66B 11/00 |
| EP | 1174381 A1 | * | 1/2002 | ............. B66B 11/02 |
| EP | 1 240 426 B1 | | 9/2002 | |
| GB | 1 233 159 | | 5/1971 | |
| IT | 2457863 A1 | * | 5/2012 | ............. B66B 9/027 |
| IT | 2316774 B1 | * | 6/2013 | ......... B66B 11/0246 |
| JP | 10-203790 A | | 8/1998 | |
| JP | 11165990 A | | 6/1999 | |
| JP | 2003-312963 A | | 11/2003 | |
| KR | 100763752 B1 | * | 10/2007 | ............. F03D 11/00 |
| WO | 97/11020 A1 | | 3/1997 | |
| WO | 01/83290 A1 | | 11/2001 | |
| WO | WO 02102701 A1 | * | 12/2002 | ............. B66B 11/00 |
| WO | 2009/092364 A2 | | 7/2009 | |
| WO | WO 2011054833 A1 | * | 5/2011 | ............. B66B 11/02 |

* cited by examiner

LIFT FOR A WIND POWER INSTALLATION

BACKGROUND

1. Technical Field

The present invention concerns a lift having a drive unit. The invention further concerns a wind power installation having a lift.

2. Description of the Related Art

Nowadays lifts, also called elevators, are usual in particular in large wind power installations for transporting people and material. That makes it unnecessary for example for maintenance engineers who have to perform operations in the pod of the wind power installation to make a strenuous and time-consuming climb by way of the ladders which generally lead perpendicularly upwardly in the pylon. In the case of wind power installations with hub heights of about 140 m which are not unusual nowadays, that would more specifically involve a vertical climb up (and naturally also a subsequent climb down) over precisely that distance of 140 m. If it is further considered that a maintenance team may be active in a number of wind power installations in the course of a working day, it will quickly be clear that using the ladders can involve an extreme physical stress.

To the extent to which the size of the wind power installations is increasing and the importance of wind power is growing, more and more installations are being erected of a size in which a lift is at least desirable, and in many cases, a necessity. As a result the lifts are becoming more and more a cost factor because they no longer occur occasionally in wind power installations.

At this point as state of the art attention is directed generally to the following publications: DE 10 2005 009 500 A1, WO 97/11020 A1, DE 101 04 351 A1 and DE 10 2006 034 299 A1.

BRIEF SUMMARY

Therefore one object of the present invention is to reduce the costs of the lift and thus make the lift economically more attractive.

For that purpose, the lift of the kind set forth in the opening part of this specification is characterized by a cupboard which is used as a lift car.

In that respect the invention is based on the adaptive use of a cupboard or electric switch cabinet in its basic structure with a bottom, side walls and a door as a lift car produced specifically for a lift. There are differences, for example in the suspension and operation of the door between a cupboard and a lift car, but the cupboard can be modified sufficient to provide safe operation of the lift, so that the complication and expenditure overall is always still less than the complication and expenditure on a lift car constructed specifically for a lift.

To permit the lift to be transported to its location of use in a space-saving fashion, provided at the top side of the lift car at opposite sides are substantially horizontally arranged holders and carriers arranged extending substantially vertically thereon for the drive unit, wherein the carriers are releasably connected to the holders and are vertically displaceable. In that way the drive unit can be pushed into the lift car for transport so that, for transport purposes, only the outside dimensions of the lift car are relevant and the drive unit does not require any additional space for transport thereof.

For that purpose in the first position the connection is made between the drive unit and the lift car in the operating position so that all of the internal space in the lift car is available for transporting freight and/or people while in the second vertically displaced position the drive unit is held in a lowered position in the lift car, which saves on transport space.

The change between the transport position and the operating position only involves releasing the connection between the drive unit and the lift car, moving the drive unit into the desired position and restoring or tightening the connection in the correspondingly different position. There is no need for further interventions. In that way the change between the transport position and the operating position can be effected very easily and with a time saving.

In a preferred development of the invention the lift system is characterized by a drive unit having a capstan winch. That means that there is no need for a complicated and expensive rail arrangement within the pylon but it is only necessary to provide two appropriately sized cables. One for normal operation and one as a catch cable to be able to stop the lift in the event of a technical failure.

Particularly preferably the entire control is arranged in the drive unit and an operating element connected to the control extends down into the lift car so that a change in the drive unit between the transport position and the operating position is possible without any intervention into the control and/or the operating element connected thereto.

A further possible way of cost savings is afforded if, instead of a particular lift car, a cupboard which is usually employed as a switch cabinet is used as the car for a lift. Switch cabinets can be produced in large numbers at lower cost, they can be used as cars for lifts and they can be easily adapted to the particular demands involved as a car for a lift so that the cost advantage is also not lost as a result of that.

Particularly advantageously the lift according to the invention is used in a wind power installation as there, apart from erection, the lift is only used occasionally and therefore has to meet the fundamental demands made on a lift, but particular comfort is not required.

A conventional wind power installation which can be equipped with a lift according to the invention includes at any event a foundation or another base on which a pylon, in particular a tubular steel or concrete pylon, is set up, at the upper end of which is arranged a wind power installation pod. Fixed to the pod is an aerodynamic rotor which is to be caused to rotate by means of wind and which for that purpose has at least one and usually three rotor blades. The pod further includes some elements for operation of the wind power installation, which can usually include the generator coupled to the aerodynamic rotor, as well as various other elements such as a drive unit for rotating the pod to change the azimuth position thereof, or for example aviation lights to make the pod better visible to air traffic, to give just some examples. The lift according to the invention is to be provided in particular in the pylon in order to convey one or more people and/or articles from the base of the pylon to the pod, and/or vice versa.

BRIEF DESCRIPTION OF THE SEVERAL VIEWS OF THE DRAWINGS

The invention is described in greater detail hereinafter with reference to the Figures in which.

DETAILED DESCRIPTION

Figure 1:
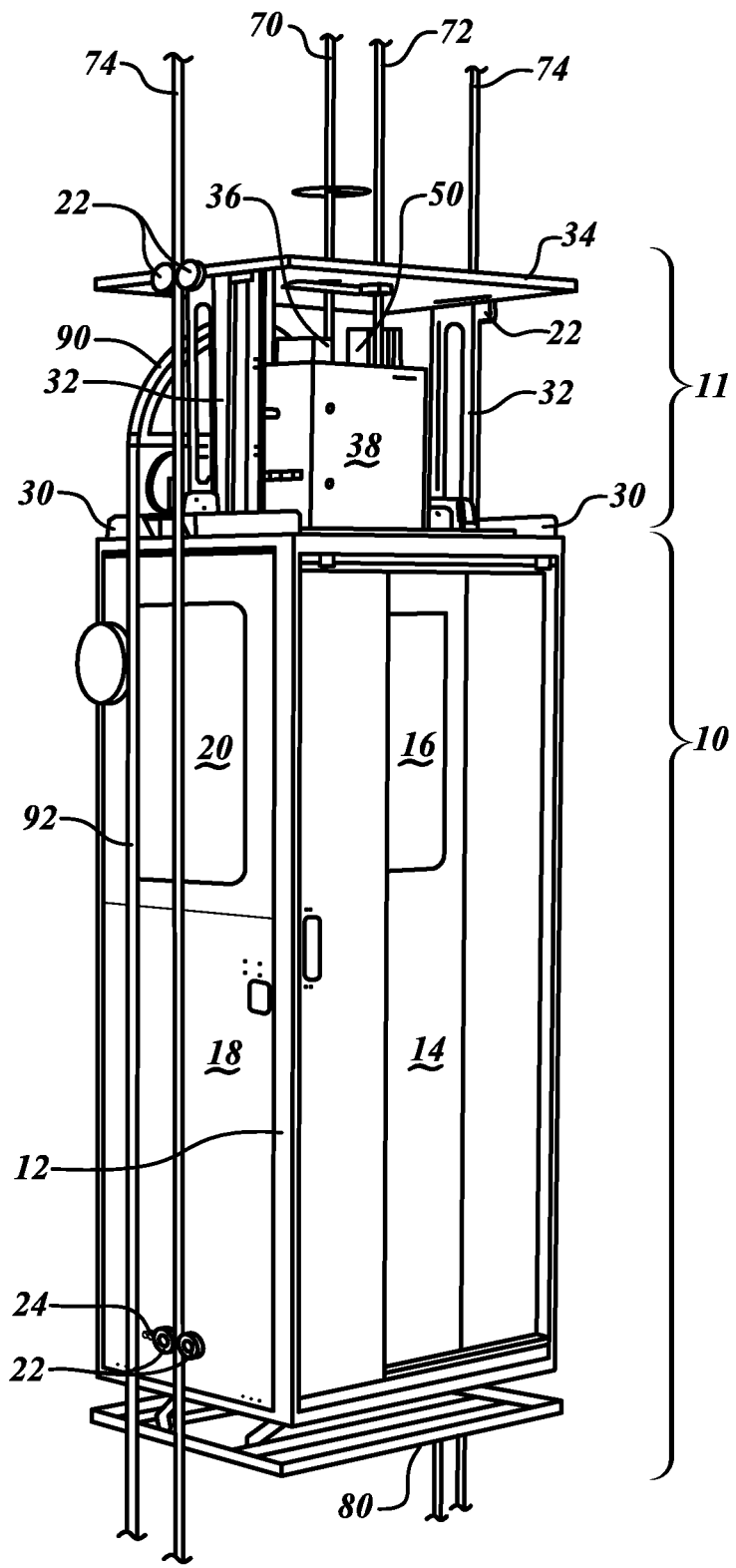
FIG. 1 shows an overall perspective view of a lift according to the invention.

FIG. 1 shows the complete lift with the lift car 10 and the drive unit 11. The lift car 10 substantially includes a switch cabinet body 12 as a load-bearing structure. Fitted into that switch cabinet body 12 is a sliding door 14 in which a window 16 is in turn provided. Side portions and naturally a rear wall (not shown in this Figure) are also installed. The side portion 18 having a window 20 can be clearly seen in this Figure.

In addition, shown at the left-hand side which is visible in this Figure are guide cable rollers 22 for the guide cable 74 and a carrier cable guide 24 through which the carrier cable 70 is guided. Corresponding guide cable rollers are disposed on the opposite side of the lift car 10 according to the invention, that side however is not shown in this Figure. There, there is also a catch cable guide (also not shown in this Figure) for the catch cable 72 which holds the lift car for example upon failure of the normal lift drive.

Holders 30 are mounted at the top side of the switch cabinet body 12 and carriers 32 which extend perpendicularly upwardly are in turn attached to the holders 30. Disposed on the carriers 32 is a roof plate 34 which protects the lift from articles which drop down. Also mounted to the holders 30 is a capstan winch 36, by means of which the lift can travel upwards or downwards in the desired direction on the carrier cable 70. There is also a control cabinet 38 in which the entire control system is disposed. This Figure also shows a catch device 50 which as a safety device holds the lift on a catch cable 72 if the drive consisting of the capstan winch 36 and the carrier cable 70 should fail. In addition to the carrier cable 70 and the catch cable 72 there are also guide cables 74 which guide the lift so as to avoid swinging movement of the lift.

Provided for the power supply is a cable 92 which is passed into the drive unit by way of a cable guide 90. Finally the Figure shows a bottom or floor switch 80 which detects when the lift encounters the floor (or another obstacle) and which can stop the lift.

Figure 2:
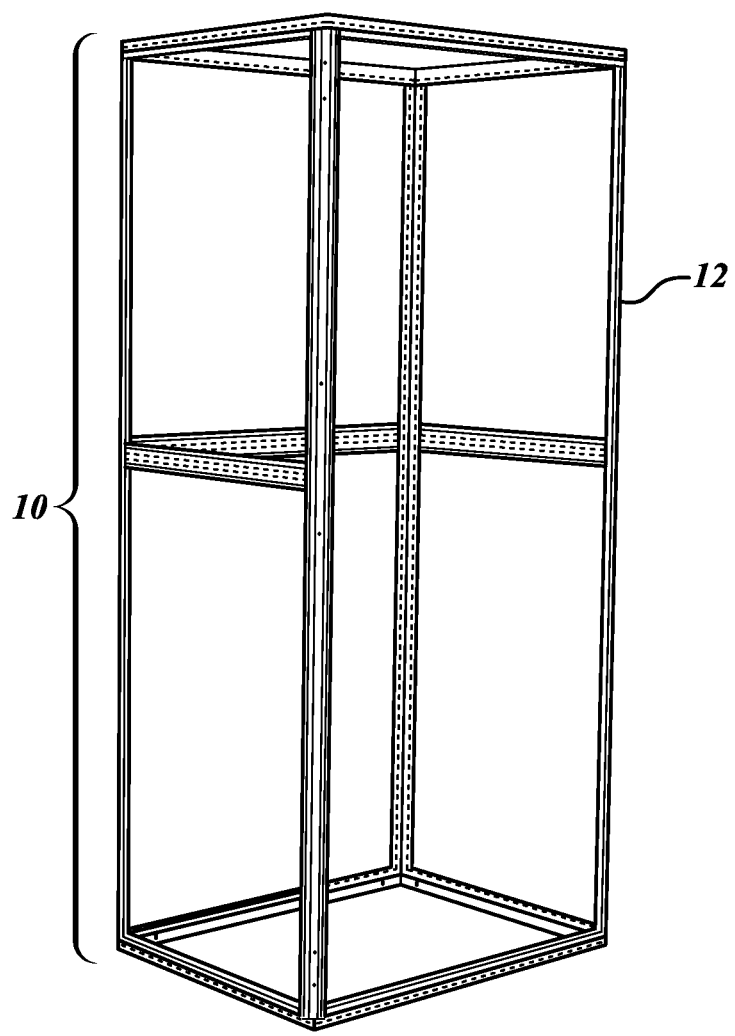
FIG. 2 shows a switch cabinet body.

FIG. 2 shows a perspective view of a switch cabinet body 12 which according to the invention forms the load-bearing structure of the lift car 10. The switch cabinet body 12 is often used to hold large banks of electrical equipment, such as computers, switches, power supplies, and the like. Such a switch cabinet body 12 is nowadays a component which is produced in large numbers and which therefore is relatively inexpensive but which enjoys sufficient strength and load-bearing capability to be able to provide for transporting people and material.

The structure of a standard electrical switch cabinet body is built to hold at least one or two hundred kilograms of heavy industrial and electrical equipment. Thus, the frame and support structure have more than enough strength and integrity to hold a person while being used as an elevator car, also called a lift car here. When being used as a lift car, the door and sides may have windows and the roof has a specific structure attached, as will now be explained.

Figure 3:
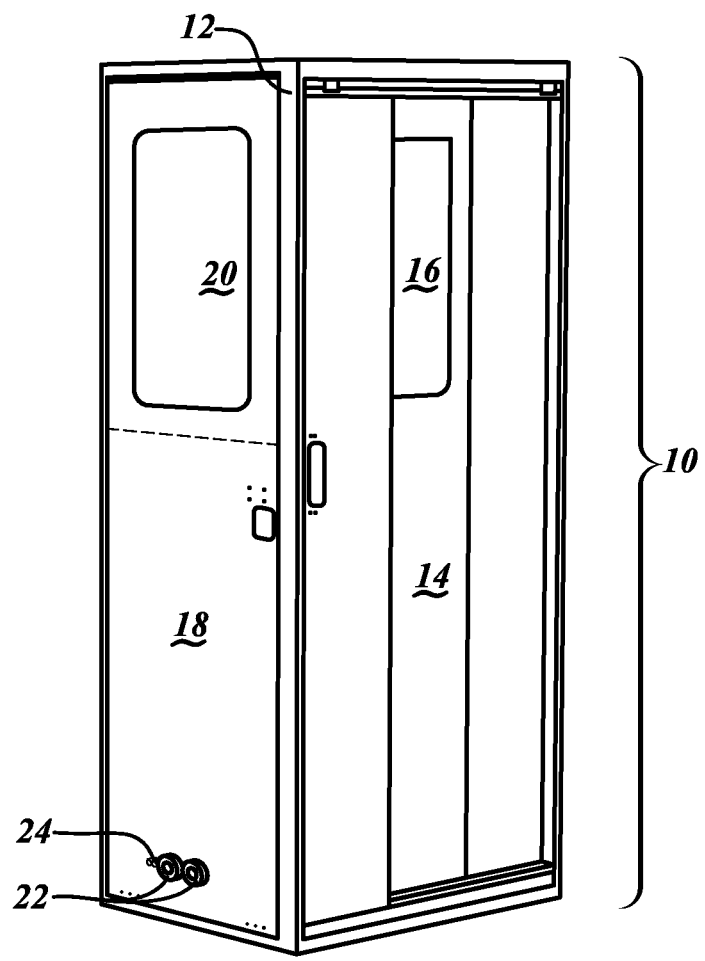
FIG. 3 shows the switch cabinet body with door and side portions.

FIG. 3 shows that switch cabinet body 12 with an installed sliding door 14 in which there is a window 16. This Figure further shows a side portion 18 having a further window 20 while illustrated in the lower region of the side portion 18 are guide cable rollers 22 and a carrier cable guide 24.

It can be clearly seen in this Figure that by relatively simple measures, the switch cabinet body 12 can be made into a car for a lift, which meets all requirements, but which overall is markedly less expensive than a standard lift car.

Such a lift car will usually be of a size to hold one person. Many standard electrical cabinets come in a size of about 200 cm high by 40-80 cm wide and 30-60 cm deep for holding racks of power supplies, computers, and switches. A lift car in a wind turbine may be used a few times a day when the turbine is first being brought online, and during routine maintenance over the life of the wind turbine a few times a month or once every few months. Thus, the electrical switch cabinet used as the lift car is sufficient to provide the basic starting structure.

Figure 4:
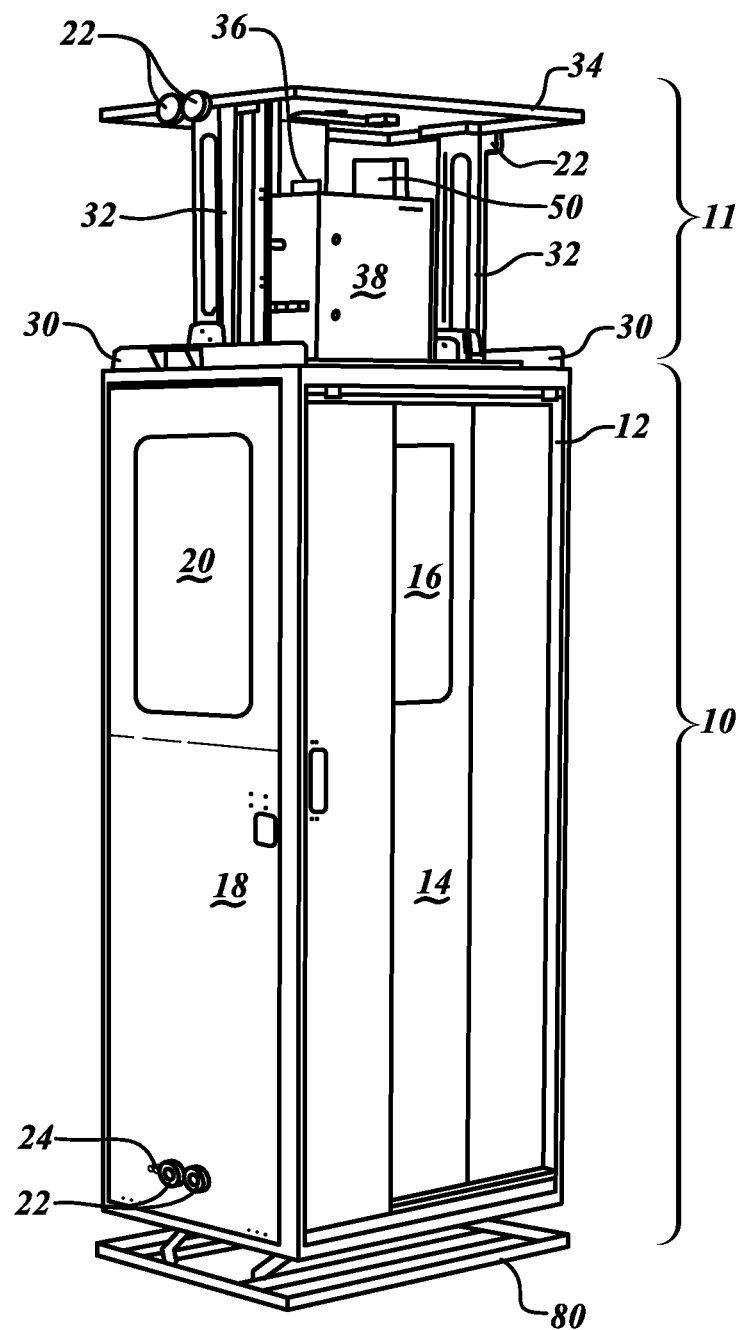
FIG. 4 shows a switch cabinet body as shown in FIG. 3 and in addition a drive unit.

In FIG. 4 the view in FIG. 3 has been supplemented by holders 30 which are fixed at the top on the switch cabinet body 12. Carriers 32 are in turn mounted perpendicularly to the holders 30. A roof plate 34 is fitted on the carriers 32. The roof plate 34 prevents articles being able to drop from above into the lift car or the drive. Arranged on the carriers is a capstan winch 36, a control cabinet 38 and a catch device 50, by means of which the essential functions of the lift can be performed. There are also guide cable rollers 22 which guide the lift during operation along guide cables which are provided, and which thus prevent the lift from swinging. Shown at the underside of the lift car 10 is a floor switch 80 which detects when the lift encounters the floor or meets an obstacle and can immediately stop the lift.

The carriers 32 are releasably connected to the holders 30 and can be displaced in the direction of the vertical axis of the lift. In that way the drive unit carried by the carriers 32 can be lowered into the lift car 10 so that the lift requires less room for transport, namely essentially the space in the lift car 10.

Figure 5:
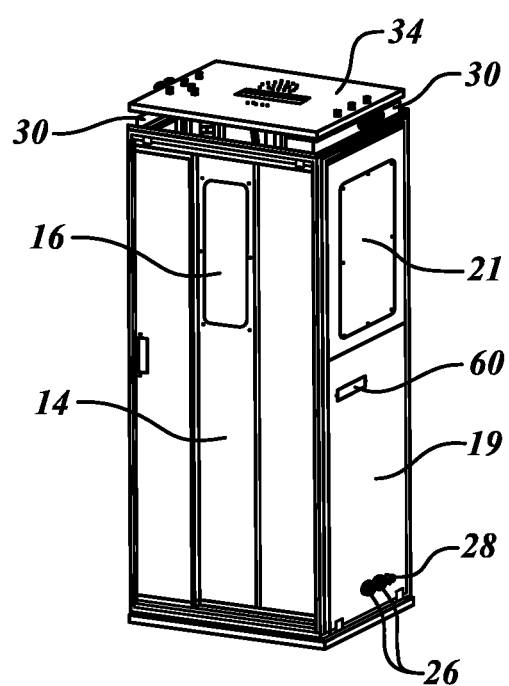
FIG. 5 shows a switch cabinet body as shown in FIG. 4 but with the drive unit lowered into the lift car.

That is shown in FIG. 5. The roof plate 34 can be seen in FIG. 5 above the holders 30 while the remainder of the drive unit is lowered with the carriers 32 (not shown in this Figure) into the lift car 10.

In addition this perspective view shows the right-hand side of the lift with a right-hand side wall 19 and a right-hand side wall window 21, as well as an external operating portion 60 shown on the right-hand side wall 19 and guide cable rollers 26 and a catch cable guide 28.

The structure for this lift car is very different from the standard life car in a number of ways. In this lift car, the drive unit is removably attached to the car itself. All that is needed is to attach the support cables at a secure location in the top region of the wind turbine. Further, the drive unit is removably attached, again a significant difference in the prior art in which drive units are not made to be easily placed on and removed from the lift car. In addition, the drive unit can move vertically with respect to the lift car for ease of transportation. The entire drive unit can be lowered into the lift car for storage and transportation, then, when ready for use, the drive unit is vertically raised upward to be coupled above the lift car 10 so a person may enter.

Figure 9:
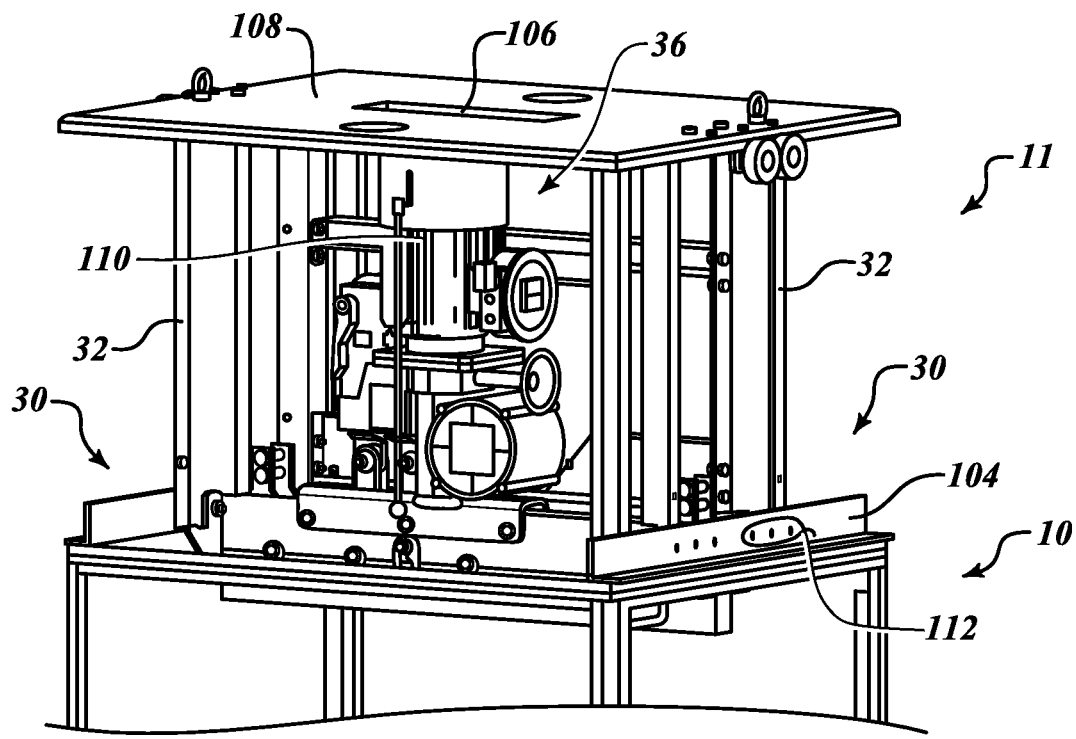
FIG. 9 is an isometric view of the drive unit above the lift car, being made ready for use.
Figure 10:
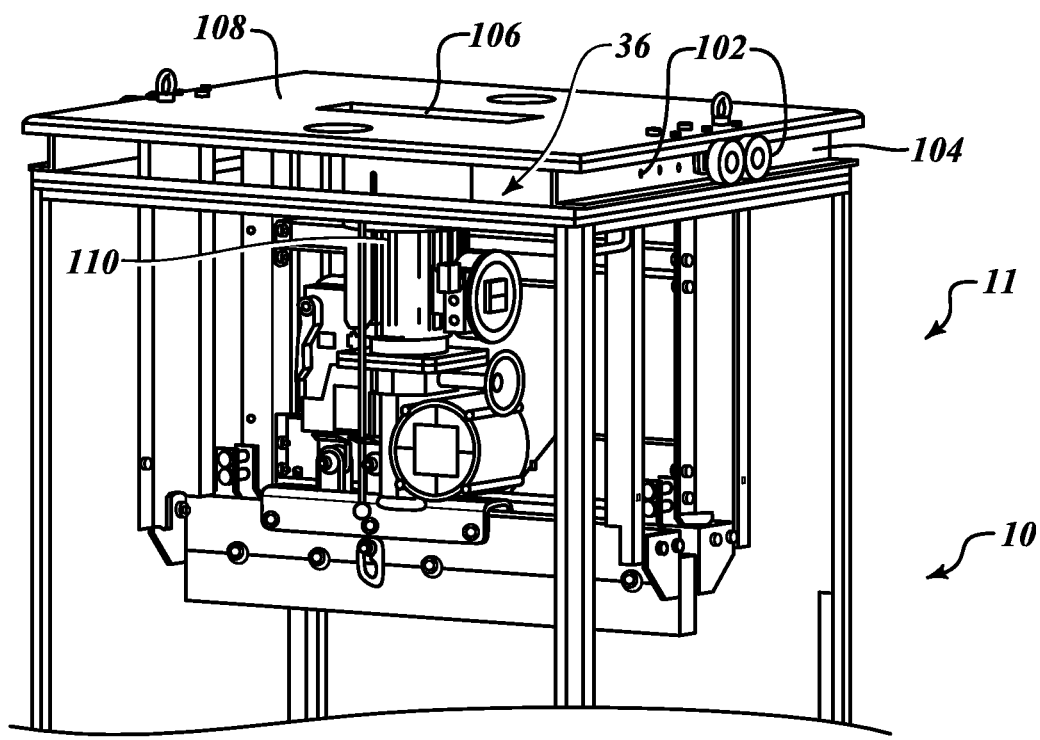
FIG. 10 is an isometric cut away view of the drive unit inside the lift car, when being shipped.

FIG. 9 shows the lift car with the drive unit in position for use and FIG. 10 shows the lift car with the drive unit inside the lift car for shipment, as will now be explained. The drive unit 11 can be raised from a transportation position according to FIG. 10 to a position ready for use as shown in FIG. 9. Accordingly, FIGS. 9 and 10 show an embodiment to illustrate these two different positions of the drive unit 11. In the transportation position according to FIG. 10, the drive unit 11 is fixed with first fasteners 102 to a support rail 104. The support rail 104 is one component in the holders 30 and is shown in more detail in FIGS. 9 and 10. The fasteners 102 may be bolts, screws, pins or any acceptable fastener to properly and securely couple the carriers 32 to the holders 104.

In the condition shown in FIG. 10, the lift takes up much less space since the drive unit is inside the electrical switch cabinet frame that forms the lift car. It can be easily transported in this condition, but of course is not ready for use. After delivery of the lift, the lift is placed, to give one example, inside the tower of a wind power installation. A lift cable fixed in the tower head is introduced into the drive unit 11 through an opening slot 106 in a roof plate 108. This lift cable, which is not shown in FIGS. 9 and 10, is then installed in the drive unit 11 and connected to the capstan winch 36, which includes a power drive member 110. The drive unit 11 is also electrically connected to a power supply and prepared for use.

The drive unit 11 is then operated in manual mode such that the drive unit 11 will be lifted by means of the lift cable and the capstan winch 36. Since the first screws 102 have been detached, only the drive unit 11 is lifted in this manual mode, i.e., it is lifted with respect to the lift car 10, until it has reached the position shown in FIG. 9. In the next step the drive unit 11 is then fixed to the same support rail 104 by a plurality of second fasteners 112.

The second fasteners 112 can be any acceptable fasteners, such as bolts, screws, pins or the like. These fasteners 112 will hold the drive unit in place while the lift car 10 is being used by a person for riding from the bottom of the wind turbine to the top. Accordingly, a high quality set of fasteners, such as hardened steel bolts, may be used that have sufficient strength and safety margin for repeated use in carrying the weight of the elevator and cargo over its expected time of use. Thus, there may be a plurality of main fasteners 112 and also one or more additional backup fasteners on each side. The fasteners 112 will be stronger and have a higher safety factor than needed for the fasteners 102, since the fasteners 102 need only hold the lift 11 in the car 10 while it is being transported, but the fasteners 112 must support the lift car 10 while it is in use and carrying a person. To save time and space, the same fasteners can be used for both, namely, a mechanic can simply remove the fasteners 102, operate the winch 36 to lift the drive unit 11 into place, and then reinstall the same fasteners, this time as fasteners 112 into either the same or different holes in rail 104 to hold the carriers 32 on the holders 30. This will be convenient and save having to ship fasteners 112 separately. Thus, while it is permitted to use different fasteners for 102 and 112, it is also permitted to use the same fasteners.

The lift is then basically ready to be used. However, some further steps such as providing a covering of the drive unit 11 can be performed in addition.

Figure 6:
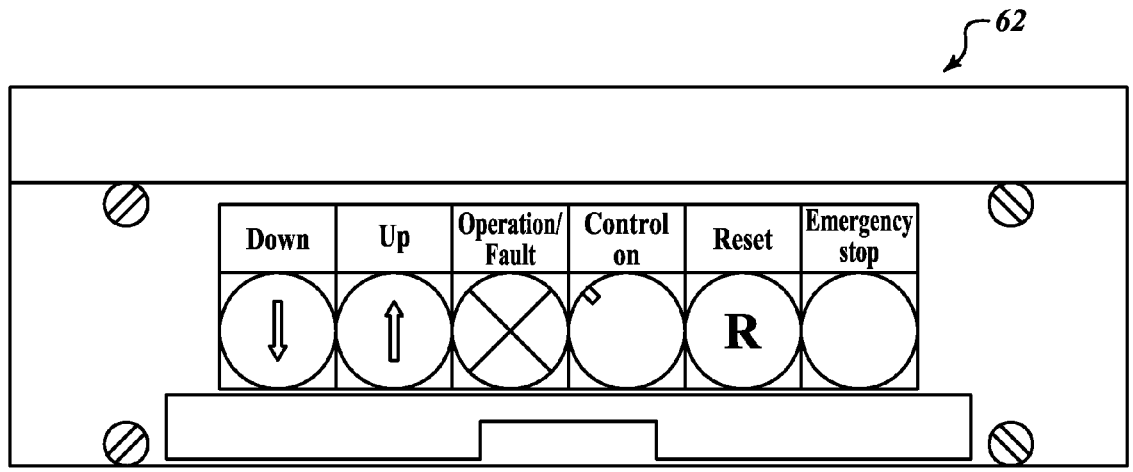
FIG. 6 shows a simplified view of the operating portion in the interior of the lift car.

To be able to operate the lift at least one operating unit is naturally required. FIG. 6 shows such an operating unit 62 which is provided in the interior of the lift car and which besides operating buttons for moving upwards or downwards includes a switch for switching on the control system, a reset button, an emergency stop switch and an operation/fault light. In that way the essential lift functions can be controlled and operational readiness or a fault can be signaled.

Figure 7:
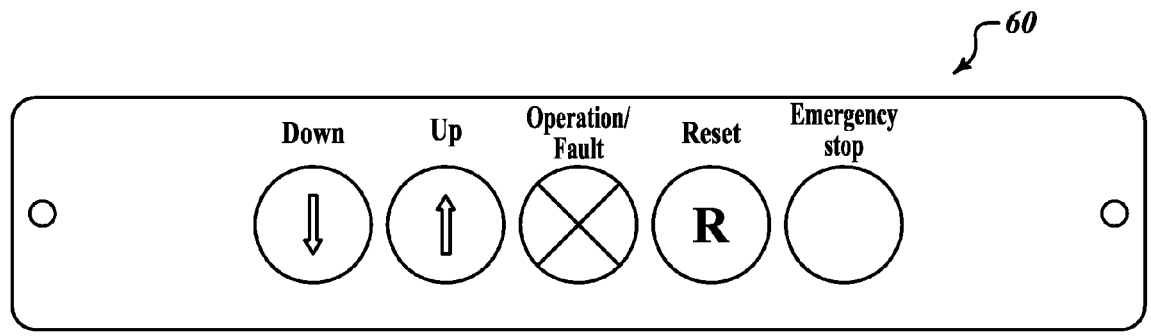
FIG. 7 shows a simplified view of the operating portion on the outside on the lift car.

FIG. 7 shows an external operating portion 60 by way of which the fundamental functions can be operated, for example when transporting material. That external operating portion 60 is used when people transport is not involved. Then the lift which is filled with material can be set in operation for example with the 'up' button in order to transport the material upwardly from the base of the installation. The 'down' button causes automatic travel in the opposite direction, that is to say downwardly.

Figure 8:
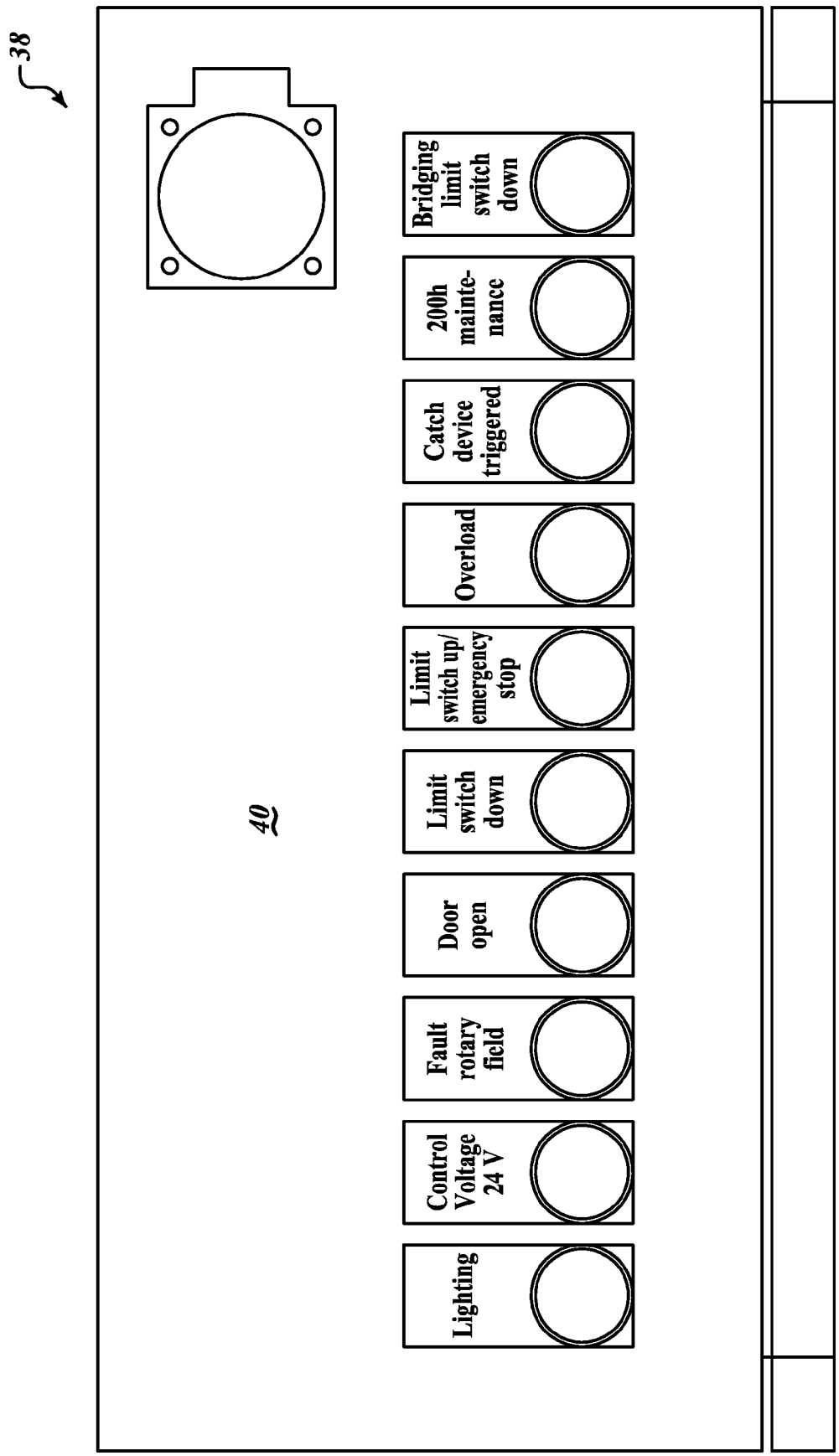
FIG. 8 shows a view of the control cabinet from the side towards the interior of the lift car.

FIG. 8 shows the side 40 of the control cabinet 38 which is towards the interior of the lift car. Provided at that side of the control cabinet 38 is a multiplicity of lights and switches which signal different operating states or which make it possible to actuate given functions. In normal operation the lift is operated by way of the operating portion 60 or the operating portion 62. As soon as a fault is displayed at one of those operating portions however, the operator can obtain further information about the nature of the fault, with a glance upwardly, namely to the underside 40 of the control cabinet 38, which is shown in FIG. 8.

The switch labeled 'lighting' serves for switching the lighting on and off.

The light identified by 'control voltage 24 V ok' shows whether the 24 V voltage required for satisfactory operation of the control is available and the lift can be operated.

The light 'fault rotary field' shows whether the rotary field at the motor for the desired operation is or is not in order. A light which is switched on indicates a fault. That can be for example a missing phase in the power supply or a wrong connection of the rotary field.

The 'door open' light shows precisely that, namely that the door of the lift is not correctly closed. If the door is correctly closed that display can also indicate a defective door switch. More specifically, both mean that the lift cannot be set in operation. That ensures that the lift moves only when the door is securely and correctly closed.

The 'limit switch down' light shows triggering of the lower limit switch (the so-called car floor switch), for example when the lowermost position is reached or the switch is actuated by an obstacle. Triggering of the upper limit switch or the emergency stop function is signaled by the 'limit switch up/emergency stop' light. Continuous lighting thereof shows that the lift has reached the upper operating position while flashing shows the uppermost emergency stop position.

The 'overload' light indicates overloading of the lift and the 'catch device triggered' light indicates that the catch device has fixed the lift on the catch cable so that further movement of the lift is not possible without releasing the catch device.

As human lives also depend on reliable functioning of the drive and the safety devices, a maintenance interval is prescribed, within which those components have to be repetitively checked. In the present example this involves a 200 hour interval. A display light is also provided for that purpose to indicate the expiry of that interval to the user. That light is labeled '200 h maintenance'.

Finally there is a 'bridging limit switch down' switch which permits bridging of the limit switch and thus enables that switch to be taken out of operation, if that is required for example upon installation for re-starting the arrangement or also when changing the cables.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A lift comprising:
a lift car, wherein a switch cabinet is used as the lift car;
a drive unit coupled to the lift car;
a roof plate; and
holders arranged at an upper end of the lift car, wherein the drive unit is configured to be coupled to the holders in a first position in which the drive unit is above the lift car and in a second position in which the drive unit is entirely inside of the lift car and covered by the roof plate, wherein the holders are arranged at and fixedly mounted to the upper end of the lift car.

2. The lift according to claim 1, wherein the holders are arranged substantially horizontally at the upper end of the lift car at opposite sides of the lift car, the lift further comprising carriers for supporting the drive unit, the carriers being arranged to extend substantially vertical from the holders, the carriers being releasably connected to the holders to place the drive unit in the first and second positions.

3. The lift according to claim 2 wherein the drive unit and the carriers move through an opening of the lift car to travel between the first and second positions.

4. The lift according to claim 1 wherein the drive unit includes a capstan winch.

5. The lift according to claim 1, further including a control system as a part of the drive unit.

6. The lift according to claim 1, further including an operating element which is connected to the control system and which extends into the lift car.

7. A wind power installation having a lift according to claim 1.

8. A lift comprising:
a switch cabinet having an opening at an upper surface;
a roof plate;
support rails at the upper surface of the switch cabinet;
carriers having first and second ends; and
a drive unit coupled to the roof plate and the carriers, wherein the drive unit is configured to be secured to the switch cabinet in a first position and a second position, when in the first position, the first ends of the carriers are coupled to the support rails and the drive unit is located above the opening of the switch cabinet and configured to cause the switch cabinet to move, when in the second position, the second ends of the carriers are coupled to the support rails and the drive unit is located entirely inside of the switch cabinet.

9. The lift according to claim 8 wherein the drive unit moves through the opening at the upper surface of the switch cabinet to move between the first and second positions.

10. The lift according to claim 8 further comprising a control system as a part of the drive unit.

\* \* \* \* \*